United States Patent [19]

Archung

[11] Patent Number: 5,100,082
[45] Date of Patent: Mar. 31, 1992

[54] HYDRAULIC POWER SUPPLIES

[75] Inventor: Ralph Archung, Issaquah, Wash.

[73] Assignee: The Boeing Company, Seattle, Wash.

[21] Appl. No.: 715,041

[22] Filed: Jun. 12, 1991

Related U.S. Application Data

[63] Continuation of Ser. No. 97,857, Sep. 17, 1987, abandoned.

[51] Int. Cl.$^5$ .............................................. B64C 13/42
[52] U.S. Cl. ................................ 244/78; 244/76 R; 60/403
[58] Field of Search ............... 244/76 R, 78; 60/327, 60/328, 329, 368, 403, 404, 405, 420, 422, 427, 911; 364/424

[56] References Cited

U.S. PATENT DOCUMENTS

| | | | |
|---|---|---|---|
| 4,533,097 | 8/1985 | Aldrich | 244/78 |
| 4,744,218 | 5/1988 | Edwards et al. | 60/368 |

OTHER PUBLICATIONS

"Airbus Hydraulic Power Always Available", *Hydraulics and Pneumatics* vol. 25 No. 12 by C. d. Galy, Dec. 1972.

*Primary Examiner*—Margaret A. Focarino
*Assistant Examiner*—James M. Kannofsky
*Attorney, Agent, or Firm*—Hughes & Multer

[57] ABSTRACT

Hydraulic power supplies for aircraft which have such hydraulically operated systems as flaps, ailerons, spoilers, rudders, elevators, brakes, and retractable and steerable landing gear. Typically, the aircraft will be of the multiengine type; and there will also be a multiplicity of hydraulic power supplies and engines. This scheme can be utilized to provide operating redundancy for the hydraulically operated devices of the aircraft. Each hydraulic power supply has a solid state controller which has a number of inputs as well as control and information providing functions. Control over the functioning of each hydraulic power supply can also be exercised by flight deck crew-operated switches which are connected to inputs of the solid state controllers.

34 Claims, 12 Drawing Sheets

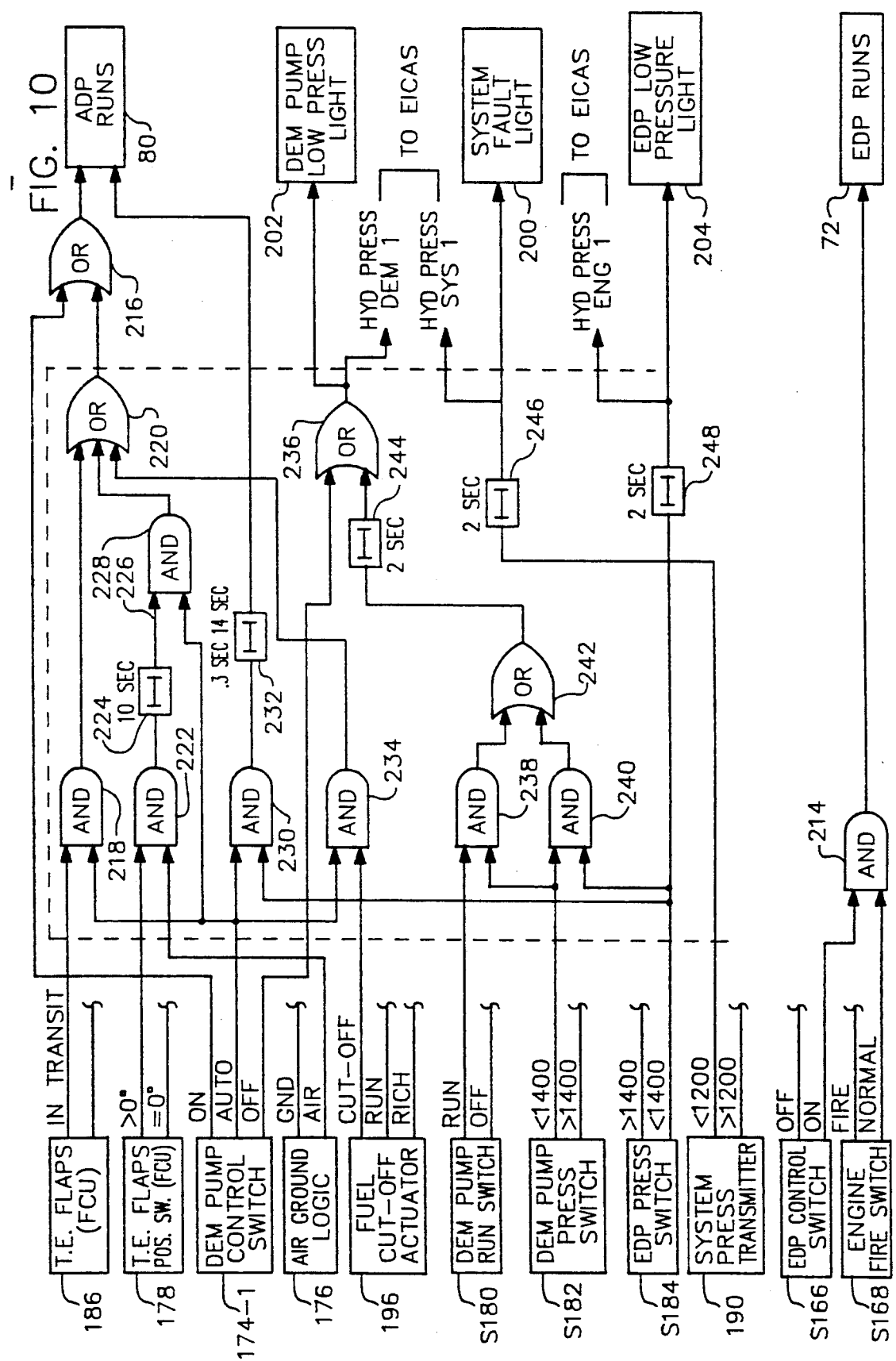

HYDRAULIC POWER SUPPLIES

This is a continuation of copending application Ser. No. 07,097,857 filed on 17 Sept. 1987, now abandoned.

TECHNICAL FIELD OF THE INVENTION

In one aspect, the present invention relates to novel, proved hydraulic power supplies which include a programmable solid state controller for: controlling the operation of the system's pumps and generating information indicative of the status of the system.

In a second aspect, the present invention relates to aircraft which are equipped with hydraulically powered devices and which have systems as described in the preceding paragraph that supply the pressurized operating fluid for those hydraulically operated devices.

The term "hydraulic power supply" is employed above and hereinafter to identify a system which is capable of making pressurized hydraulic fluid available —for example, to operate the control surfaces and brakes of an airplane, to raise and steer the airplane's landing gear, and to operate such other hydraulically operated equipment as may be on board.

BACKGROUND OF THE INVENTION

Heretofore, commercial aircraft, including the first generations of those propelled by jet engines, employed cable and pushrod connections between the flight control surfaces on the wings and tail of the aircraft and the control wheel, column, and pedals in the cockpit or flight deck. In some instances, these manual flight control systems were hydraulically boosted. However, these hydraulic systems were strictly auxiliary in nature, being employed only for such mundane tasks as raising landing gear. Thus, the failure of a hydraulic power supply system in such aircraft was of no serious consequence as the plane could continue to the next destination with the landing gear down (in some cases the gear could be raised with a manual handcrank).

With the advent of larger et aircraft such as the Boeing 747, fully powered operating systems for the aircraft's flight control surfaces became mandatory. Such airplanes are simply too large for a pilot with reasonable strength to fly and land safely without assistance. Thus, particularly in the case of larger aircraft, the status of hydraulic operating systems for the primary control surfaces has been elevated from auxiliary to primary. In fact, these hydraulic systems have become even more critical than the aircraft's engines because a safe landing can conceivably be made without engines whereas this is essentially impossible without hydraulic power.

An onboard supply of pressurized hydraulic fluid is required for the operation of an airplane's hydraulic systems. The criticality of hydraulic power supplies for the hydraulic systems of larger aircraft requires that these hydraulic power supplies be redundant. In addition, those systems must be easily serviced and maintained so that the airplane will not be delayed while mechanics attempt to diagnose and repair aircraft that are prepared for takeoff.

In aircraft with a flight crew of three, it is customarily the duty of the flight engineer to monitor the hydraulic systems and hydraulic power supplies of the aircraft during flight and to advise the aircraft pilots and ground personnel if faults occur. The latest generation of commercial airplanes, however, is designed to be operated by a crew of two; i.e., without a flight engineer. Thus, the functions, duties, and assignments of the flight engineer must be eliminated by automation or simplified so that they can be performed by the pilots without increasing flight crew duties to the extent that crew members are overburdened and can no longer operate the airplane safely.

The current approach to the automation of an aircraft's hydraulic power supplies involves the hard wiring of the appropriate components. Because the components of a particular system may be located on the flight deck and also at remote locations in the aircraft, and because these components typically each have their own separate logic, locating a fault can be a tedious and time consuming task. Furthermore, the "hard wiring" approach to the automation of onboard hydraulic power supplies is costly, both in terms of weight and money, because of the hardware and the extensive electrical wiring that is required.

SUMMARY OF THE INVENTION

I have now invented, and disclosed herein, novel onboard hydraulic power supplies for aircraft which, in contrast to those employing extensive hard wiring, are less expensive, lighter in weight, and easier to troubleshoot and maintain. At the same time, these novel systems meet the desired goal of reducing flight crew workload, thereby making the aircraft in which they are installed easier and safer to fly.

In the novel hydraulic power supplies disclosed herein, inputs from all of the system sensors; e.g., pressure switches, temperature transmitters, control switches, etc. are routed to a single, centralized solid state controller. The controller is a self-contained card that possesses all of the logic necessary to control the pumps of the hydraulic power supply and to generate those outputs which keep the flight crew continually aware of the real time status of the hydraulic power supply. In addition, this logic can readily be configured to: verify the validity of system information with a reasonableness check; perform a system/self-test upon command and transmit information related to failures to a remotely located, central maintenance computer; and verify the proper configuration of a flight deck hydraulic control panel prior to starting the aircraft engines.

Typically, aircraft of the type with which the present invention is concerned will have more than one engine; and a separate hydraulic power supply driven by each engine will be employed to provide safe operation through redundancy. In these applications of my invention, separate, identical cards are employed to control each of the multiple hydraulic power supplies. A different control scheme may be required for each of the power supplies. The identical cards are readily programmed to meet this requirement by connecting the system inputs and outputs to appropriate pins of each different card.

By routing all inputs to one central location in accord with the principles of the present invention and by controlling the system pumps and generating status indicative outputs with solid state logic at that location, the wiring required to automate an aircraft's hydraulic power supply can be significantly reduced. This results in corresponding savings in cost and weight and significantly simplifies the location and repair of faults. In the case of one particular airplane, for example, the weight saving has been estimated to be as high as 27 pounds; and the recurring cost savings is currently estimated at $960 per airplane.

OBJECTS OF THE INVENTION

From the foregoing, it will be apparent to the reader that the primary object of the invention resides in the provision of novel, improved, hydraulic power supplies.

Other more specific but nevertheless important objects of the invention reside in the provision of hydraulic power supplies as characterized in the preceding object and particularly designed for onboard aircraft applications:

which are particularly designed to supply the fluid for operating those hydraulic mechanisms of aircraft which require too much strength to operate safely (or even at all) without force multiplication;

which are capable of reducing the workload of an airplane's flight deck crew by automating hydraulic power supply system monitoring and other functions relating to those power supplies that were heretofore performed by a crew member;

which are lighter, less expensive, and easier to troubleshoot than onboard hydraulic power supplies heretofore automated by hard wiring;

which can be employed in concert to provide the redundancy required for the safe operation of airplanes in which hydraulic operation of control systems and other mechanisms has a primary status;

in which the system pumps are controlled from a central location and in which all inputs are to that location and all outputs emanate therefrom;

which employ a solid state controller that is a single, self-contained card with logic which is readily programmable to meet the requirements imposed on a particular hydraulic power supply;

which, in conjunction with the preceding object, employ a solid state controller that is capable of: performing system/self tests upon command and transmitting information relating to failures and their location to a remotely located, central maintenance computer;

which are as least as capable of reducing the effort required to operate and monitor the power supply as heretofore employed, hard wired approaches to the automation of such systems.

Other important objects and features and additional advantages of my invention will be apparent to the reader from the foregoing and the appended claims and as the ensuing detailed description and discussion proceeds in conjunction with the accompanying drawing.

BRIEF DESCRIPTION OF THE DRAWING

In the drawing:

FIG. 7 shows the relationship between FIGS. 7A and 7B which together constitute a schematic diagram of a solid state controller for the hydraulic power supply associated with the Number 4 engine of the airplane of FIG. 1; FIGS. 8–10 are schematic diagrams of the solid state controllers for the power supplies associated with the Numbers 3, 2, and 1 engines of the airplane respectively; these figures also show the inputs to and outputs from those controllers.

DETAILED DESCRIPTION OF THE INVENTION

Figure 1:
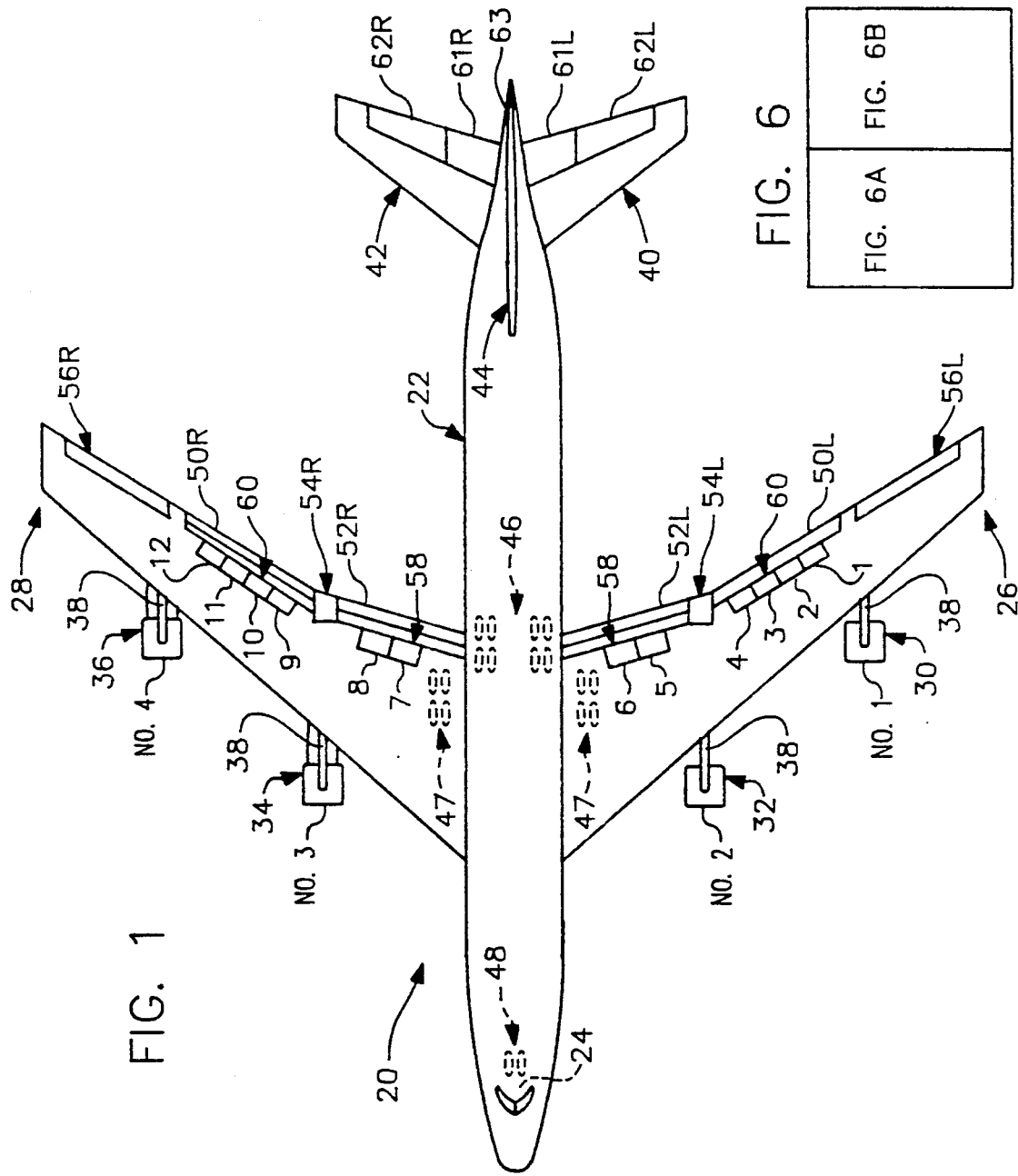
FIG. 1 is a plan view of one airplane which is designed to be equipped with hydraulic power supplies embodying the principles of the present invention.

I pointed out above that the novel hydraulic power supplies disclosed herein are particularly designed to make available the pressurized hydraulic fluid required to operate the control surfaces and brakes of large commercial aircraft and to raise and steer the landing gear of such aircraft. One particular aircraft of this type is the Boeing 747. A Boeing 747 is depicted pictorially in FIG. 1 and identified by reference character 20.

Airplane 20 is of conventional configuration. It includes: a fuselage 22 with a flight deck 24; left and right, sweptback wings 26 and 28 from which No. 1, No. 2., No. 3 and No. 4 engines 30, 32, 34, and 36 are supported by pylons 38; left and right horizontal stabilizers 40 and 42; and a vertical stabilizer 44. Airplane 20 has retractable, steerable, main landing gear 46; wing supported landing gear 47; and also steerable and retractable nose gear 48. Both the main landing gear 46 and nose gear 48 are retracted and steered hydraulically, and the landing gear are equipped with redundant braking systems which are also operated hydraulically.

The flight control surfaces of airplane 20 are also hydraulically operated. These include: inboard and outboard trailing edge flaps 50 and 52, inboard and outboard ailerons 54 and 56, and inboard and outboard spoilers identified generally by reference characters 58 and 60. Also numbered among the control surfaces are inboard and outboard pitch control surfaces or elevators 61 and 62 respectively appended to left and right, horizontal stabilizers 40 and 42 and an upper, vertical directional control surface or rudder 63 appended to vertical stabilizer 44.

Figure 2:
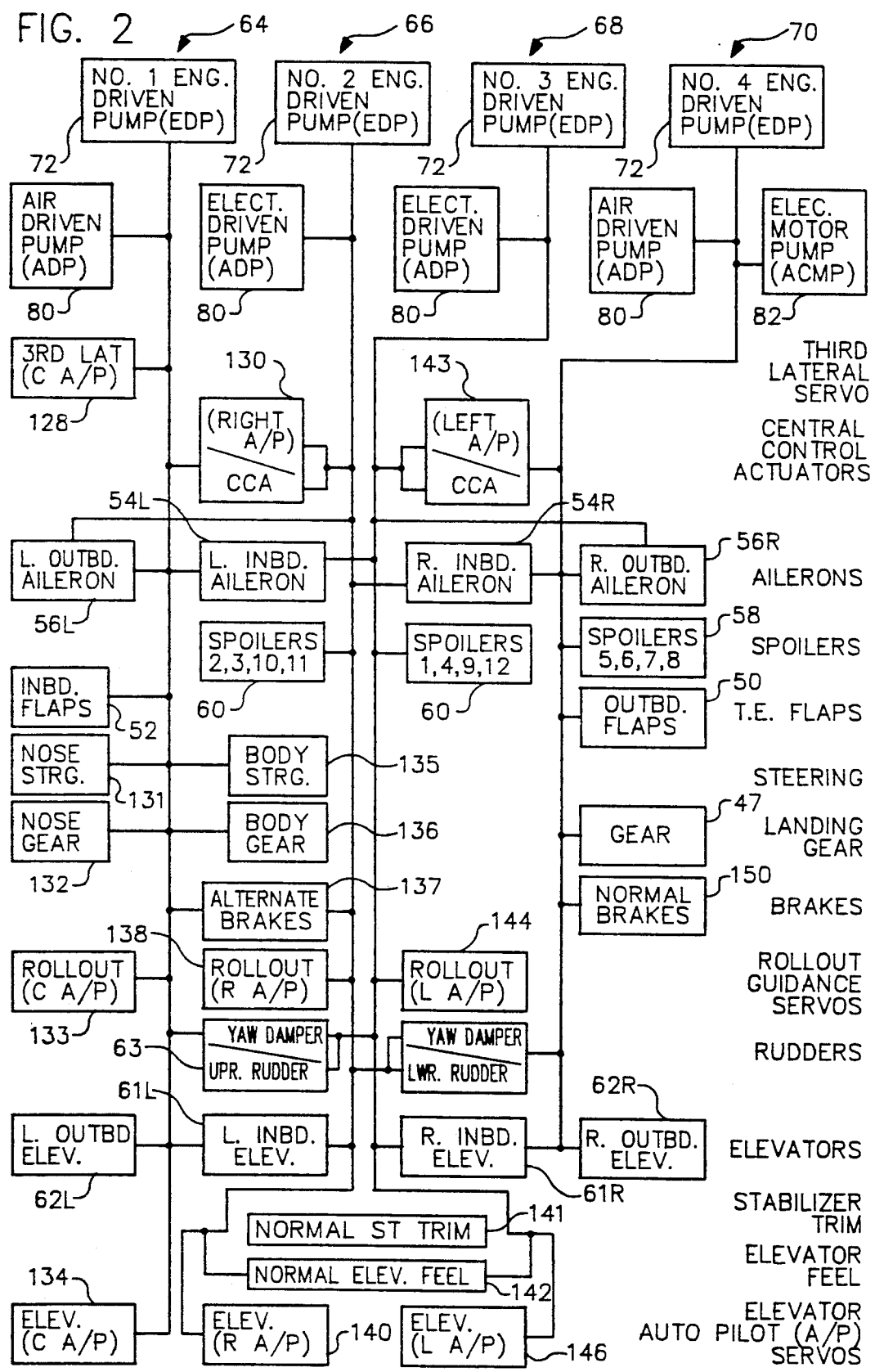
FIG. 2 is a block diagram of a representative hydraulic power supply.

Turning now to FIG. 2, the pressurized hydraulic fluid for the systems employed to operate the mechanisms identified in the last two paragraphs is redundantly supplied by four independent hydraulic power supplies 64, 66, 68, and 70. These systems have pumps 72 that are respectively driven by the number 1, 2, 3, and 4 engines identified by reference characters 30 ... 36 in FIG. 1. Except in the case of the aircraft's braking systems discussed below, the four hydraulic power supplies are completely isolated so that hydraulic fluid cannot transfer from one power supply to another and thereby cause operating anomalies or failures.

The hydraulic power supply 70 with the pump 72 driven by the No. 4 engine 36 of airplane 20 is representative.

Figure 5:
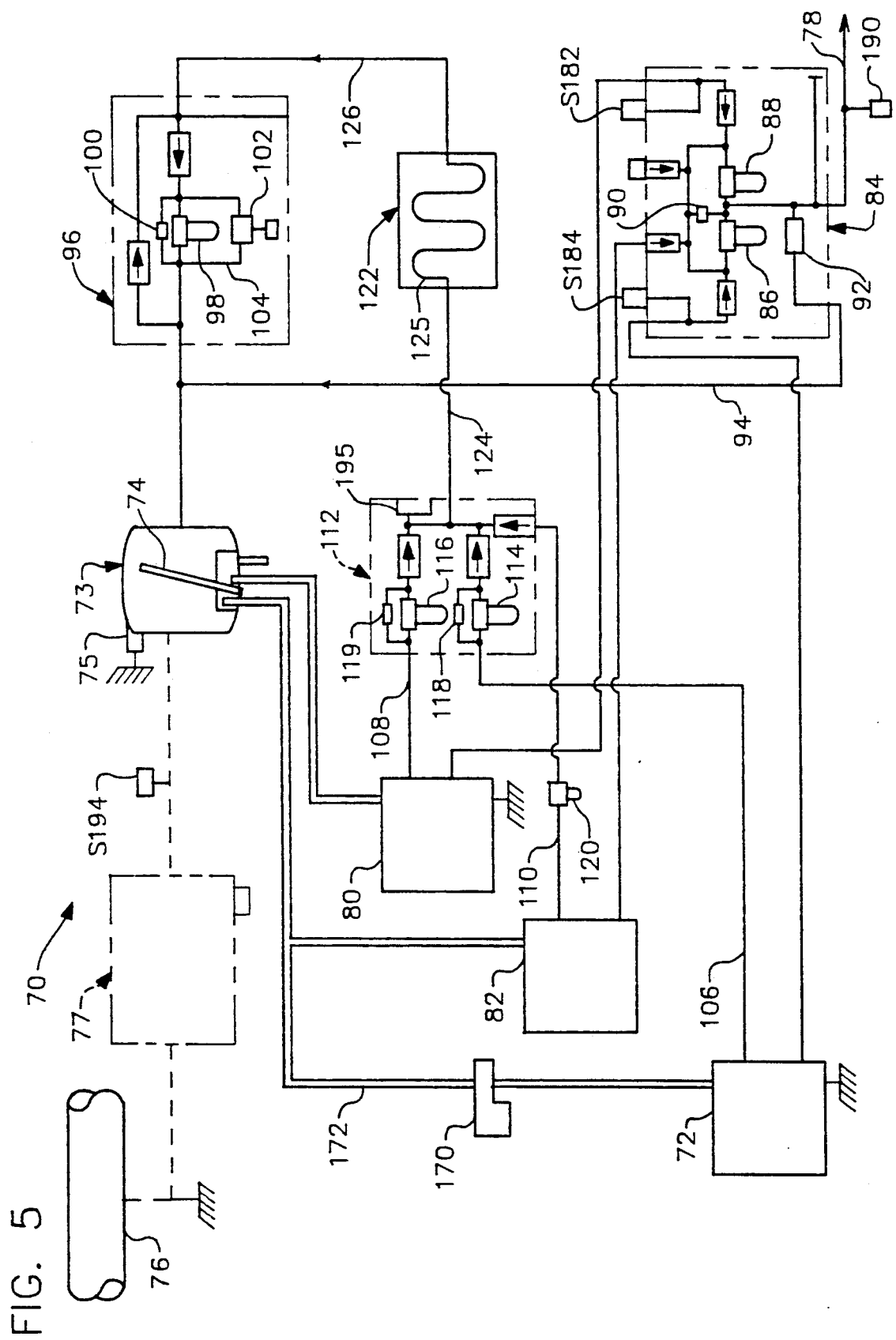
FIG. 5 is a mechanical diagram of the hydraulic power supply of FIG. 2.

The mechanical components of hydraulic power supply 70, illustrated in FIG. 5, include: a hydraulic fluid reservoir 73 equipped with a fluid level transmitter 74 and a relief valve 75. This reservoir is pressurized for efficient operation of the power supply with air supplied from a duct 76 in the pneumatic system of airplane 20 via a reservoir air pressurization module 77.

The hydraulic fluid is pumped from hydraulic fluid reservoir 73 through hydraulic fluid supply line 78 to the various operating systems of airplane 20 by engine driven pump 72, an air driven demand pump 80, and an electrically driven auxiliary pump 82.

Auxiliary pump 82 operates only when airplane 20 is on the ground and engines 30 ... 36 are shut down.

As pump 72 is driven by engine number 4, it runs whenever that engine is operating.

Demand pump 80 can be operated in concert with pump 72 to meet increased demands upon power supply 70. It can also be operated in place of pump 72 if the Number 4 engine 36 is shut down because of overheating or for any other reason. Demand pump 80 is driven by air from the pneumatic system of airplane 20 and is operated in a predictive fashion whenever the demand upon hydraulic power supply 70 will be increased; e.g., when the main landing gear 46 of the airplane are being raised, or when the flaps 50 and 52 are being lowered, or when a number of hydraulically powered systems are operating simultaneously as is the case when airplane 20 is landing.

Downstream from pumps 72, 80, and 82 is a pressure filter module 84 which includes filters 86 and 88, a pressure indicator 90 which monitors the pressure across filters 86 and 88, and a relief valve 92. When the latter is open, it bypasses hydraulic fluid back to reservoir 73 through a bypass 94 to keep the pressure on that fluid from exceeding a preselected level.

Hydraulic fluid returned to reservoir 73 from the operating systems of airplane 20 flows first through a return filter module 96. That module includes a filter 98, a Δ pressure indicator 100 for monitoring the pressure across filter 98, and a relief valve 102 in a filter bypass 104.

The fluid in hydraulic power supply 70 is cooled to keep its temperature and the temperatures reached by the mechanical components of the hydraulic power supply within safe operating limits. To this end, the three pumps 72, 80, and 82 of hydraulic power supply system 70 are equipped with case drains 106, 108, and 110. These are connected to a case drain module 112.

In case drain module 112, hydraulic fluid circulated to that module from pumps 72 and 80 is circulated through filters 114 and 116 to remove impurities. Delta (Δ) pressure indicators 118 and 119 monitor the pressures across these filters.

A third filter 120 in case drain 110 removes impurities from the fluid flowing through that drain.

The hot hydraulic fluid discharged from case drain module 112 is cooled in a heat exchanger 122 by fuel drawn from the fuel system of airplane 20 and circulated through a heat exchanger coil 125 in module 112. The heat exchanger is connected to case drain module 112 by a line 124, and the cooled hydraulic fluid is returned to reservoir 73 via return filter module 96 through a heat exchanger discharge line 126.

The hydraulic power supplies 64, 66, and 68 driven by the Number 1, 2, and 3 engines 30 ... 34 may be identical to the system 70 just described except that they will typically not have that electrically driven auxiliary pump 82 of system 70 which provides hydraulic service on the ground when the engines 30 ... 36 of airplane 20 are shut down.

Also, the demand pumps 72 of the hydraulic power supplies 66 and 68 associated with Number 2 and Number 3 engines 32 and 34 will typically be driven electrically rather than being powered by air drawn from the pneumatic system of airplane 20.

Nevertheless, as an option, the hydraulic system 64 associated with the Number 1 engine 30 may also be equipped with an electrically driven auxiliary pump. Another option is to substitute pneumatically driven demand pumps for the electrically driven demand pumps in the hydraulic power supplies 66 and 68 associated with the Number 2 and Number 3 engines 32 and 34.

Except as discussed hereinafter, the mechanical details of the four hydraulic power supplies 64, 66, 68, and 70 of airplane 20 are not germane as far as the present invention is concerned. Therefore, such non-essential details will not be described herein.

Referring still to the drawing, FIG. 2 shows which hydraulic systems of airplane 20 are supplied with operating fluid from each of the four hydraulic power supplies 64, 66, 68, and 70. As was suggested above and as will be pointed out in detail below, each of those systems which are essential to the safe operation of airplane 20 draw hydraulic fluid from two hydraulic power supplies. Thus, airplane 20 can continue to operate normally if one of those hydraulic power supplies goes down.

In particular, and as shown in FIG. 2, power supply 64 serves: two autopilots 128 and 130 provided to operate wing-mounted control surfaces of airplane 20; the left outboard and left inboard ailerons 56L and 54L; the Numbers 2, 3, 10, and 11 outboard and inboard spoilers 60 and 58; the inboard flaps 52; the mechanisms 131 and 132 for steering and for retracting nose gear 48; one of three rollout guidance servos 133; the left outboard elevator 62L; and elevator autopilot 134.

Also, hydraulic power supply 64 serves the steering mechanism 135 for the main landing gear 46; the mechanism 136 for retracting that gear; an alternate braking system 137 which is employed to stop aircraft 20 if the main braking system fails; the upper rudder 63 of the aircraft; and left inboard elevator 61L.

Referring still to FIG. 2, the hydraulic power supply 66 associated with Number 2 engine 32 serves: the right wing central control actuator or autopilot 130, the left outboard and inboard ailerons 56L and 54L, and left inboard elevator 61L. This provides redundancy, ensuring that the foregoing essential control surfaces and autopilot 130 can still be operated if one of the two hydraulic systems 64 or 66 should fail.

The hydraulic system 66 driven by Number 2 engine 32 also serves Numbers 2, 3, 10, and 11, outboard and inboard spoilers 60 and 58 and the alternate brake system 137. As will become apparent below, airplane 20 also has a main hydraulic braking system supplied with fluid from Number 4 engine associated hydraulic power supply 70. And, as hydraulic power supplies 64 and 66 independently service an alternate brake system, airplane 20 in effect has three independent braking systems.

In addition to providing the services just discussed, hydraulic power supply 66 also provides operating fluid for the right rollout guidance autopilot 138, the lower rudder (not shown) of airplane 20, the right elevator autopilot 140, stabilizer trim system 141, and a "normal elevator feel" system 142. This system is employed to change the force required to move elevators 62 and 61 so that the pressure which the pilot must exert to control the pitch of the aircraft will not become unduly light or unduly heavy as the pitch of the aircraft changes.

Referring still to FIG. 2, the hydraulic power supply 68 associated with Number 3 engine 34 serves the left central control actuator or autopilot 143; the right outboard aileron 56R; the left inboard aileron 54L; Nos. 1, 4, 9, and 12, outboard and inboard spoilers 60 and 58; the left rollout guidance servo 144; upper rudder 63; the right inboard elevator 61R; stabilizer trim and feel control systems 141 and 142; and the left elevator autopilot servo 146.

It will be appreciated from FIG. 2 that hydraulic power supply 68 also contributes to the redundancy desired for safe operation of airplane 20. In this case redundancy of hydraulic fluid supply is provided in conjunction with hydraulic power supplies 64 and 66 for the left inboard aileron 54L, the upper rudder 63, and the stabilizer trim and elevator feel control systems 141 and 142.

As discussed above, the fourth of the hydraulic power supplies with which airplane 20 is equipped is that identified in FIG. 2 by reference character 70. That power supply is associated with the Number 4 engine 36.

Hydraulic power supply 70 serves the left central control actuator or autopilot 143, the right inboard and outboard ailerons 54R and 56R, the Nos. 5, 6, 7, and 8 outboard and inboard spoilers 60 and 58, the outboard trailing edge flaps 50, the system 136 for retracting the wing-supported landing gear 47, the primary or normal braking system 150, the 30 lower rudder, and the right outboard elevator 62R.

Hydraulic power supply 70 provides redundancy in conjunction with hydraulic power supplies 66 and 68 for the left central control actuator 143 the right inboard and outboard ailerons 54R and 56R, the lower rudder, and the right inboard elevator 61R.

Thus, in the manner discussed above, the supply of operating fluid is duplicated for each of those hydraulically operated control surfaces and autopilots considered essential to the safe operation of airplane 20.

Reference was above made to three rollout guidance autopilots 133, 138, and 144. These are engaged during landing, typically when airplane 20 is about five feet above the runway, to keep the airplane traveling in a straight line after it touches down.

Figure 6A:
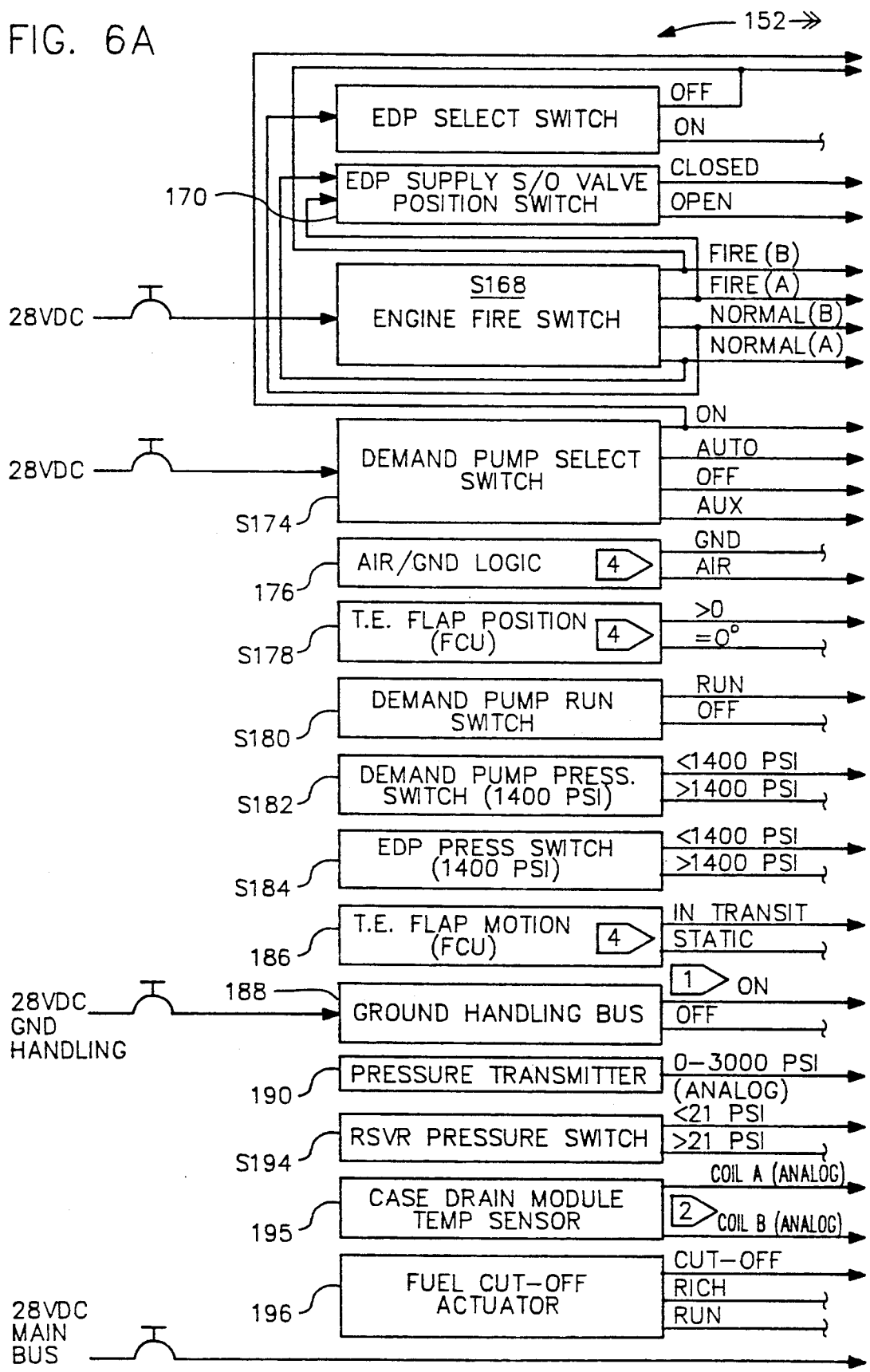
FIG. 6 shows the relationship between FIGS. 6A and 6B which together constitute a block diagram of the hydraulic power supply.
Figure 6B:
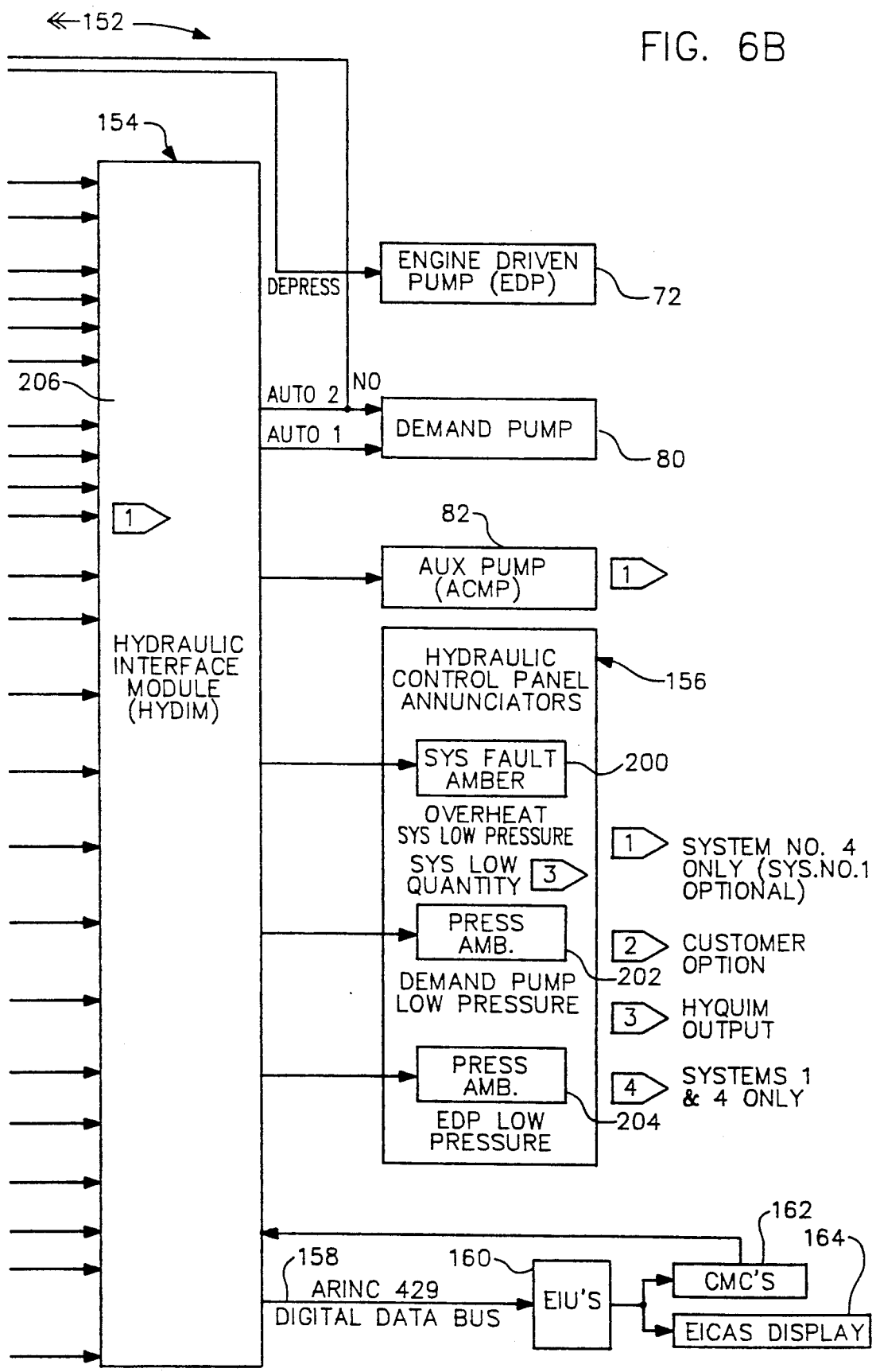

Referring now to FIG. 6, each of the four, above discussed hydraulic power supply systems 64, 66, 68, and 70 also includes a solid state monitoring and control unit. A typical unit along with the features which are optional and peculiar to different ones of the hydraulic power supplies 64 . . . 70 is shown in FIG. 6 and identified by reference character 152.

Each of the four control/monitoring units includes a hydraulic interface module or solid state controller 154. The four modules are identical. As discussed above, they can be programmed to perform the specific functions necessitated by the hydraulic power supplies in which they are incorporated by employing specific input and outputs of the self-contained cards on which the control and monitoring logic is provided.

The outputs from each hydraulic interface module 154 are connected to the engine driven pump 72 and the demand pump 80 of the hydraulic power supply in which the interface module is incorporated and to the auxiliary pump 82 of the hydraulic power supply if that particular power supply is equipped with an auxiliary pump. Additional outputs from the hydraulic interface module lead to a cockpit hydraulic panel 156 (see also FIG. 3).

Figure 4:
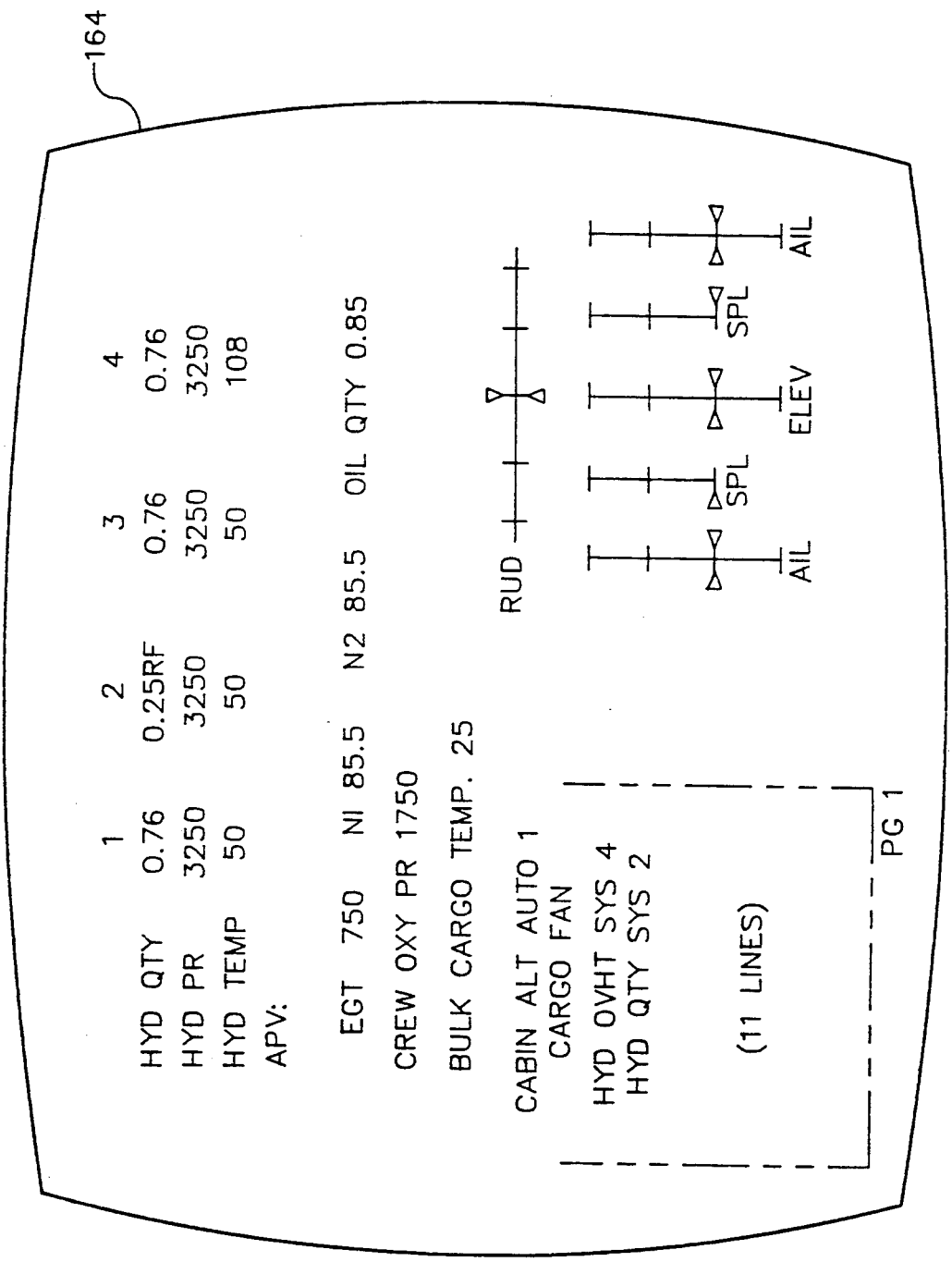
FIG. 4 depicts a representative display on an engine indicating and crew alerting system (EICAS) which is located on the flight deck of the aircraft and which provides the flight deck crew with a continually updated, real time report on the status of the hydraulic power supply.

Still other outputs are connected through an ARINC 429 digital data bus 158 and an EIU (electrical interface unit) 160 to a central maintenance computer 162 and an EICAS (engine indicating and crew alerting system) CRT 164 (see also FIG. 4).

Figure 3:
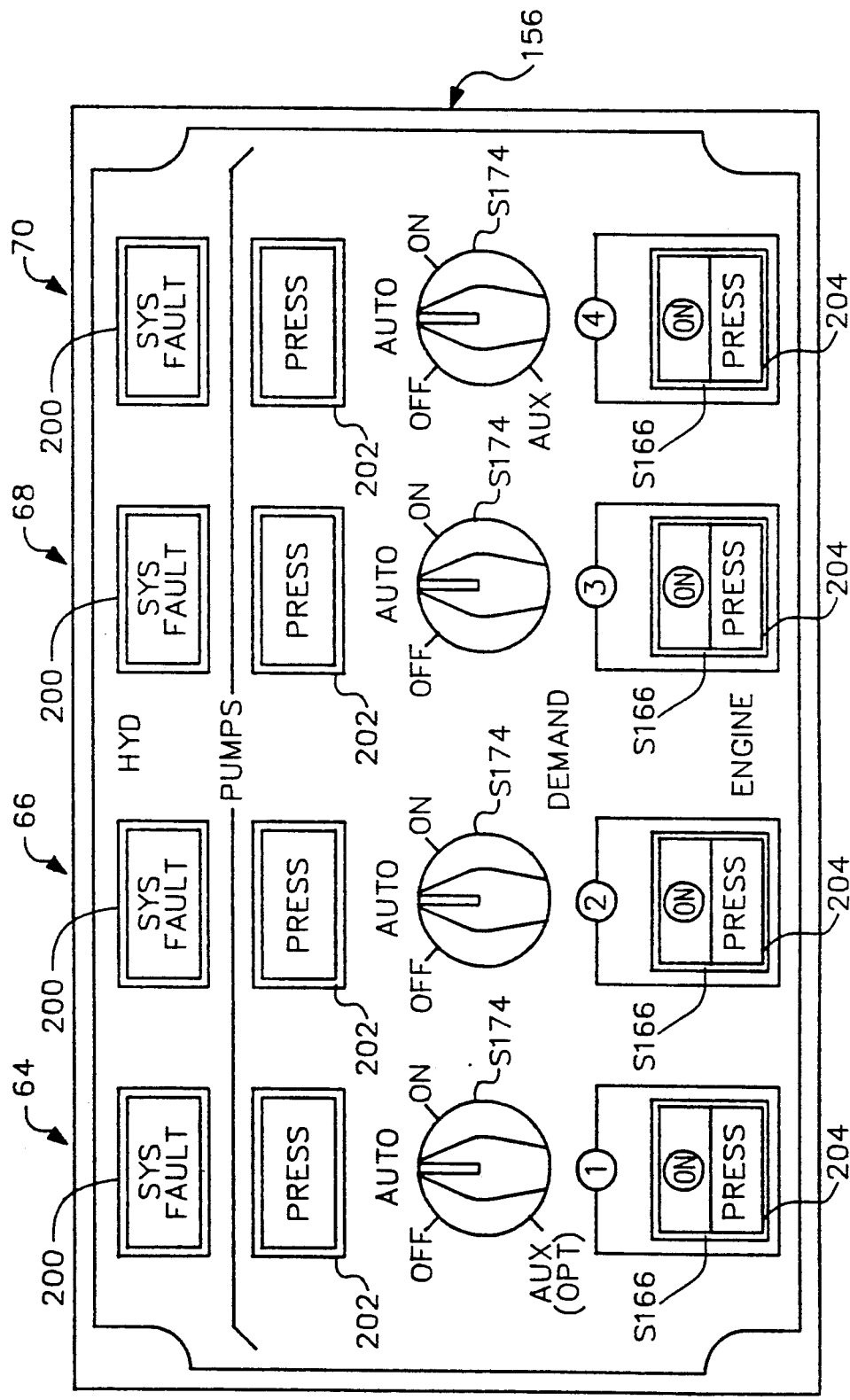
FIG. 3 is a front view of a cockpit panel for the hydraulic power supply of FIG. 2.

Also incorporated in each of the four control/monitoring units 152 of hydraulic power supplies 64 . . . 70 is an on/off or select switch S166 (EDP select switch) for the engine driven pump 72 of the power supply in which the control/monitoring unit 152 is included (see also FIG. 3). This switch is normally left in the CN position but can be displaced to OFF by the pilot to shut down the engine driven pump 72 if circumstances warrant. Also, the engine driven pump 72 which is controlled by this switch is automatically transferred from ON to OFF in the event of an engine fire to prevent hydraulic fluid—spilled from a ruptured line, for example—from feeding that fire.

More specifically, if an engine fire occurs, the pilot can actuate an engine fire switch S168. One of the results of closing this switch is that the engine driven pump 72 of that hydraulic power supply 64 . . . 70 associated with the overheated engine is thereby caused to shut down. At the same time, a normally open supply shutoff valve 170 in the line 172 between the hydraulic fluid reservoir 73 and the engine driven pump 72 of the involved hydraulic power supply (see FIG. 5) is closed to keep any hydraulic fluid that may escape from feeding an engine fire.

It will be noted from FIG. 6 that switch S168 has two positions to which it can be displaced in the event of a fire. This is provided so that first one and then the second of two independent fire extinguishing systems (not shown) can be activated by the flight deck crew. Throwing switch S168 to either the FIRE A position or the FIRE B position causes the associated supply shutoff valve 170 to close and causes the engine driven pump 72 of the involved hydraulic power supply 64 . . . 70 to be shut down.

Another pilot-operated switch incorporated in control/monitoring unit 152 is identified by reference character S174 in FIGS. 3 and 6. This demand pump control switch is employed to: start up and shut down the demand pump 80 of the hydraulic power supply 64, 66, 68, or 70 in which the unit 152 is incorporated at the option of the flight deck crew; to provide for the normal, automatic startup and shutdown of that pump in the face of a predicted increased demand for hydraulic fluid that cannot be supplied solely by the engine driven pump 72 or if the engine with which a particular power supply is associated fails or is shut down by cutting off its fuel supply; and to start up and shut down the auxiliary pump 82 if the hydraulic power supply in which a particular unit 152 is incorporated has a pump of that character.

As shown in FIG. 6, supply shutoff valve 170, the engine fire switch S168, and the EDP select switch S174 for demand pump 80 all have inputs to hydraulic interface module 154.

Another input to that module is from air/ground logic 176 (normally activated only in those control/monitoring units 152 incorporated in the Number 1 and Number 4 engine associated hydraulic power supplies 64 and 70). This logic identifies whether airplane 20 is in the air or on the ground. This is required because different systems are enabled when airplane 20 is flying and when it is on the ground.

The next input to hydraulic interface module 154 (also provided only in those control/monitor units 152 associated with the Number 1 and Number 4 engine associated hydraulic power supplies 64 and 70) provides a flap position indication from a trailing edge flap control unit position switch S178. This indication is whether the flaps are: (a) at a zero degree setting, or (b) down and consequently have a greater than zero degree angle of attack. This input is employed when airplane 20 is on the ground and the outboard and inboard flaps 50 and 52 are lowered to insure that the operation of the flaps does not cause the pressure on the hydraulic fluid available to the hydraulic systems of airplane 20 to droop.

The input just described is activated only in those hydraulic interface modules 152 of Number 1 and Number 4 engine associated hydraulic power supplies 64 and 70. This is because only those two hydraulic power supplies service the outboard and inboard flaps 50 and 52 of airplane 20.

Next to provide an input to each hydraulic interface module 154 is a demand pump run switch S180 and a demand pump pressure switch S182 which is located in the pressure module 84 of the hydraulic power supply 64 . . . 70 (see, also, FIG. 5). The demand pump run switch S180 provides an indication of whether the demand pump 80 of each hydraulic power supply 64 . . . 70 is running or shut down, and the pressure switch S182 indicates whether the pressure on the hydraulic fluid available to the various hydraulic systems of airplane 20 is greater than or less 1400 psi or some other designated, minimum, safe pressure.

A related input, engine driven pump pressure switch S184 provides an indication of whether the delivery pressure of engine driven pump 72 is above or below 1400 psi or another pressure level deemed the minimum for the safe operation of airplane 20.

The next input to hydraulic interface module 154, again employed only in those control/monitoring units 152 in the Number 1 and Number 4 hydraulic power supplies 64 and 70, indicates whether the trailing edge flaps 50 and 52 of airplane 20 are stationary or about to become in transit (i.e., to be moved). The unit providing this input is identified in FIG. 6 by reference character 186. This input, like that indicative of flap position, is provided for only the Number 1 and Number 4 engine associated hydraulic power supplies 64 and 70. This is because, as discussed above, only those two hydraulic power supplies service the aircraft's inboard flaps 52 (hydraulic power supply 64) and outboard flaps 50 (hydraulic power supply 70).

A predictive input indicating that the flaps 50 and 52 are about to be moved is important because this ensures that the capacity needed to prevent a sudden hydraulic fluid pressure drop will be available when the flaps are first actually moved.

So that demand pumps 80 of hydraulic power supplies 64 and 70 will operate in a predictive manner, it is actually the difference in position between the flap-operating lever and the flaps, which is indicative of an ensuing demand for increased capacity rather than the flap motion as such, that is employed as an input to start up the appropriate demand pump 80.

Another important instance in which the demand pumps 80 of hydraulic power supplies are automatically started up with demand pump control switch S174 in the AUTO position is in the event of an engine fire and the consequent shutdown of the associated engine driven pump 72 of the involved hydraulic system 64 . . . 70. In this circumstance, the demand pump 80 of the involved system is automatically started up to make available the pressurized hydraulic fluid needed for continued safe operation of airplane 20.

Another input to each hydraulic interface module identified by reference character 188 in FIG. 6, indicates that it is connected to an external power source when it is on the ground. The control/monitoring unit 152 of the Number 4 engine associated hydraulic power supply 70 is equipped with a ground handling, electrical bus input 188; and the Number 1 engine associated system 64 also will be if that power supply is optionally equipped with an auxiliary pump 82.

The next input to each of the control/monitoring units 152 is from a pressure transmitter 190 (see also FIG. 5) on the output (or supply) line 78 from each of the hydraulic power supplies 64 . . . 70. This input is indicative of the pressure on the hydraulic fluid supplied to the various operating systems of airplane 20; i.e., those utilized to operate its control surfaces and brakes and to raise its main, wing, and nose gear and to steer its main landing gear and nose landing gear.

An input to each hydraulic interface module is also provided from a pressure switch S194 (see FIGS. 5 and 6). This switch indicates whether the reservoir pressure in air pressurization module 77 is above or below 21 psi or some other selected pressure end, consequently, whether the pneumatic head wanted for effective operation is present on hydraulic fluid reservoir 73.

The case drain module 112 discussed above is equipped with a sensor 195 which detects the maximum hydraulic fluid temperature in each of the four hydraulic power supplies 64 . . . 70; i.e., the temperature of hydraulic fluid drained from the pumps 72 and 80 (and 82 if present) of the hydraulic systems to cool that fluid and thereby keep that fluid and the mechanical components of the hydraulic power supplies from being overheated. This temperature sensor also provides an input to the hydraulic interface module 154 of each power supply 64 . . . 70.

As shown in FIG. 6, two inputs from the case drain module temperature sensor 195 can optionally be provided. This option is employed for ease of case drain module temperature verification as determining that the case drain module temperature is high or that the temperature sensor has instead failed can otherwise be a tedious, potentially dangerous task.

The final input to the hydraulic interface module is from a fuel cut-off actuator 196. This input indicates whether the flow of fuel to an engine 30 . . . 36 with which a particular control/monitoring unit 152 is associated is cut off or, if fuel is flowing to that engine, whether it is doing so in a normal "run" mixture or in a "rich" mixture (typically employed in starting up the engine). This input is provided so that the demand pump 80 of a hydraulic power supply 64 . . . 70 associated with a particular engine can be automatically started up if that engine is shut down during flight. In that case, the output from the engine driven pump 72 of the involved hydraulic power supply may be non-existent and will typically not be adequate to meet the needs of the aircraft's hydraulic systems, even if the engine is windmilling and the engine driven pump is therefore being operated at partial capacity.

It will be apparent to the reader from the foregoing that the control over the engine driven and demand pumps 72 and 80 (and auxiliary pump 82 if present) of each hydraulic power supply 64 . . . 70 is exercised, be it automatically or by the pilot, by way of the hydraulic interface module 154 incorporated in the involved hydraulic power supply.

I also pointed out above that each hydraulic interface module 154 has outputs which keep the flight deck crew of airplane 20 continuously advised of the status of each hydraulic power supply 64 . . . 70.

Furthermore, I pointed out above that the hydraulic interface module 154 of each hydraulic power supply 64 . . . 70 has outputs which operate those hydraulic panel annunciators indicative of hydraulic power supply system status. Three annunciators 200, 202, and 204 are provided for each of the hydraulic power supplies. Each of these lights amber if a condition warranting the attention of the flight deck crew arises.

Specifically, an annunciator 200 is illuminated if a fault is detected in the involved hydraulic power supply 64 . . . 70. These faults are overheating, low system pressure, and low hydraulic fluid level.

Similarly, a pressure annunciator 202 is illuminated if the pressure on the output from the associated demand pump 80 drops below a safe level; and an annunciator 204 is illuminated if the output pressure from the associated engine driven pump 72 drops below a specified, safe level.

It was also pointed out above that outputs from each hydraulic interface module are employed to operate an EICAS 164 with a CRT (cathode ray tube) or other display. That display is also located on the flight deck 24 of airplane 20. As is shown in FIG. 4, the information continuously displayed and updated in real time on EICAS display 164 for each of the hydraulic power supplies 64 . . . 70 includes: the quantity of hydraulic fluid in that system, the temperature of that fluid, and the pressure on it.

Finally, it is to be noted that the central maintenance computer 162 which processes information significant to maintenance personnel is connected back to each of the four hydraulic interface modules 154. Each hydraulic interface module 154 is thereby enabled to store failure information for ten flight legs to facilitate fault isolation and repair of failed components.

The hydraulic interface module 154 of the control/monitoring unit 152 for the Number 4 engine associated hydraulic power supply 70 makes maximum use of the capabilities of the logic afforded by a hydraulic interface module as disclosed herein. This logic, select as discussed above by employing appropriate module inputs and outputs, is shown in FIG. 7 in which the hydraulic interface module is identified by reference character 154-4.

Figure 7A:
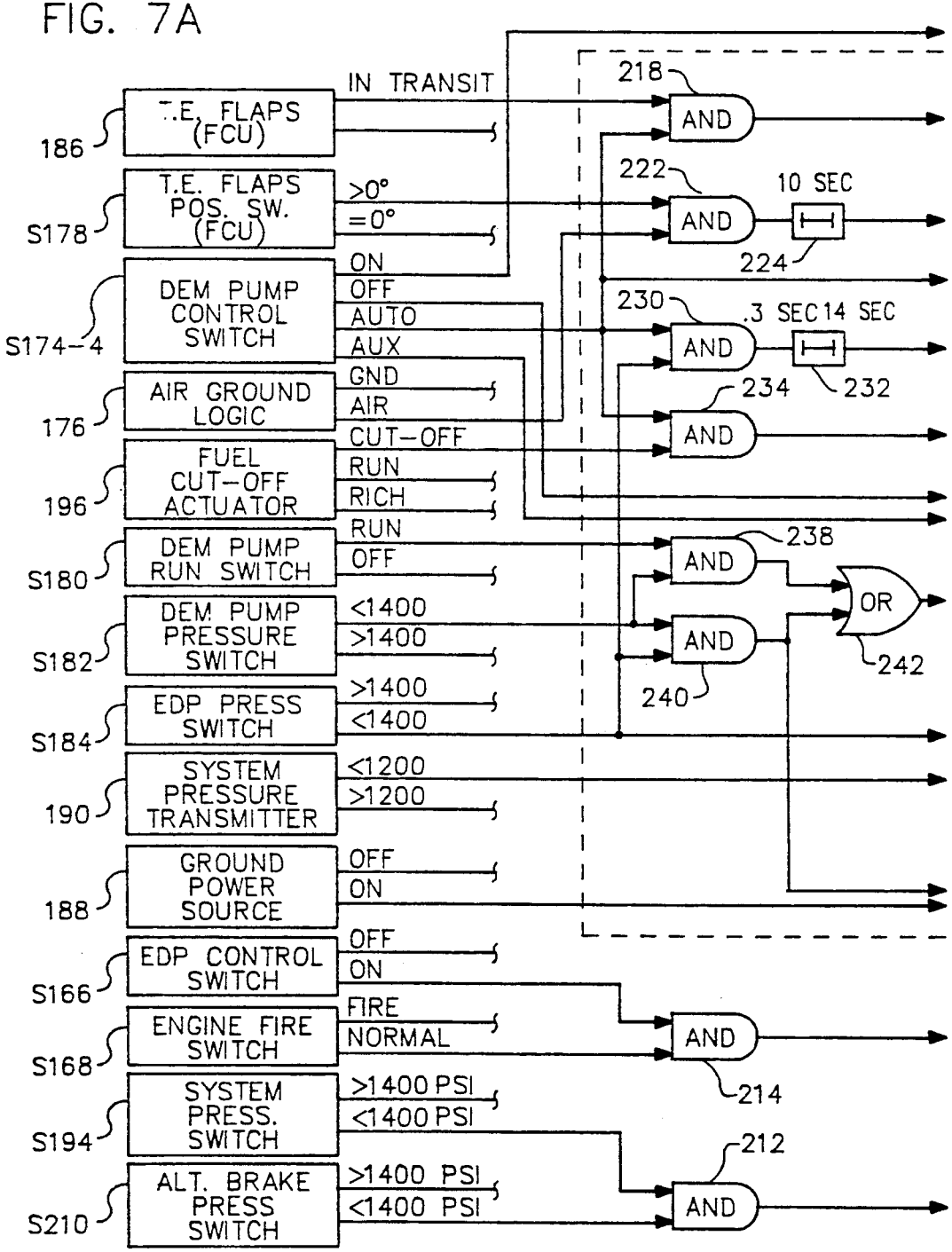
FIGS. 7A and 7B also show the inputs to and outputs from the solid state controller.
Figure 7B:
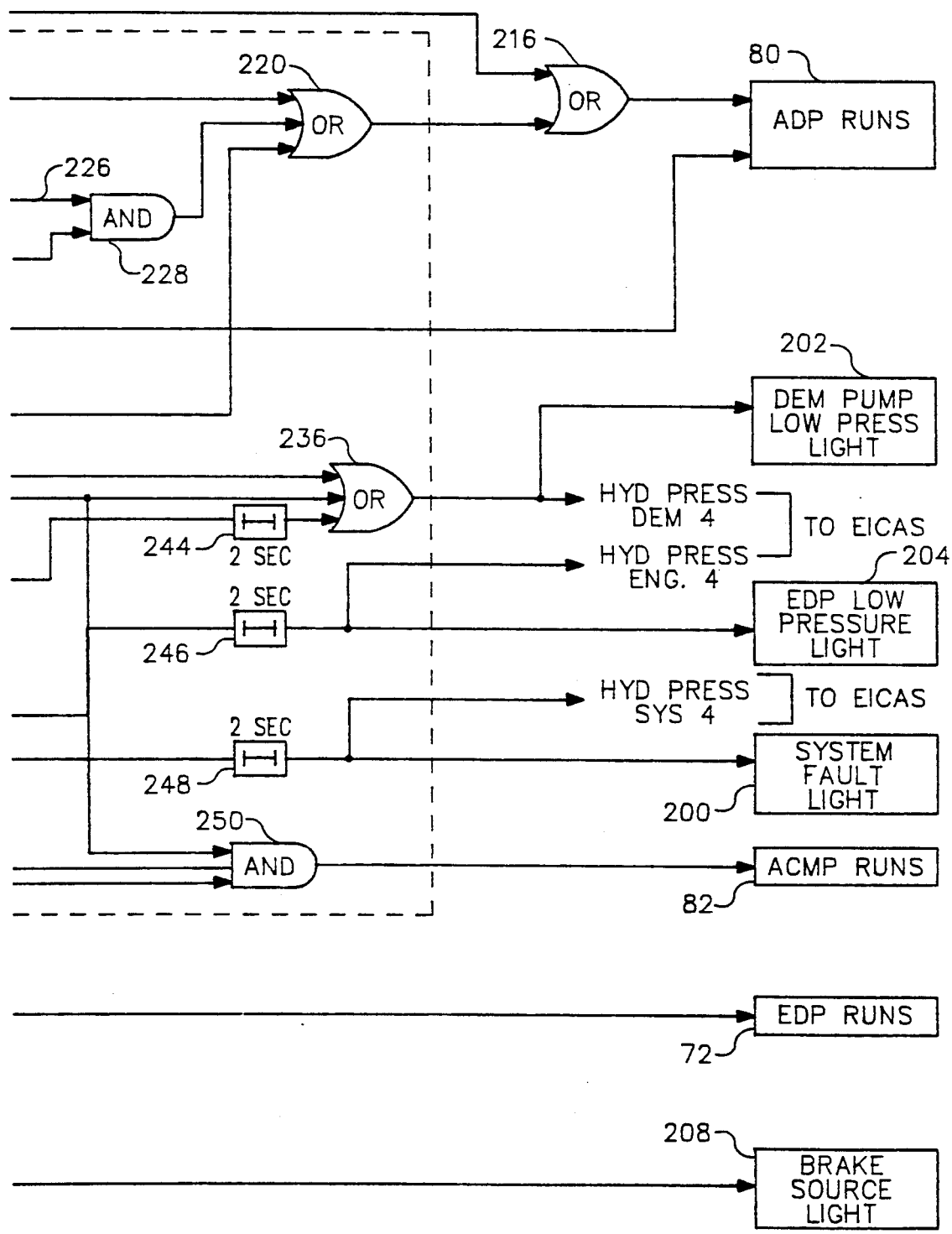

As shown in FIG. 7 and as discussed above, hydraulic interface module 154-4 is employed: to control the operation of the demand and auxiliary pumps 80 and 82 of the Number 4 engine associated hydraulic power supply 70; to illuminate the demand pump low pressure annunciator 202, the engine driven pump low pressure annunciator 204, and the system fault annunciator 200 of hydraulic power supply system 70 as and when appropriate; and to furnish to EIU interface 160 the data needed to: (a) display on EICAS 164 a continually updated report on the status of the hydraulic power supply, and (b) furnish problem related information to central maintenance computer 162.

In addition, although not strictly part of hydraulic interface module 154-4, the card 206 containing the logic for that module also includes: the logic for controlling the operation of the engine driven pump 72 of Number 4 engine associated hydraulic power supply 70 and the logic which causes a brake source warning light 208 located in the cockpit 24 of airplane 20 to be illuminated when the hydraulic pressure in both the main and alternate brake systems falls below a designated, typically 1400 psi, level pressure.

In conjunction with the latter functions, <1400 PSI outputs of hydraulic power supply system pressure switch S194 and alternate brake pressure switch S210 are connected through an AND gate 212 to brake source warning light 208, and that light will accordingly be illuminated as indicated above if the pressure in both the main and alternate brake systems falls below 1400 psi. With the pressure in either the alternate or main systems (or all systems) above that level, the brake source warning light 208 will remain off; and the flight crew will thereby be advised that at least one of the brake systems has sufficient pressure to safely slow down (or stop) airplane 20 after it lands.

As far as the control of the engine driven pump 72 of hydraulic power supply 70 is concerned, FIG. 7 shows that, as discussed above, the engine driven pump will run as long as Number 4 engine 36 is operating provided that: (a) the pilot has thrown the engine driven pump control or select switch S166 to the ON position, and (b) engine fire switch S168 is in one of its normal positions. This mode of operation is obtained by connecting the ON output from switch S166 and the NORMAL output from engine fire switch S168 to the engine driven pump through an AND gate 214. Conversely, if the pilot throws engine driven pump switch S166 to the OFF position or engine fire switch S168 to a FIRE position, AND gate 214 will become nonconductive; and engine driven pump 72 will be shut down.

As discussed above, there are a number of circumstances in which the demand pump 80 of Number 4 engine associated hydraulic power supply 70 is run to keep the pressure on the hydraulic fluid supplied by system 70 from drooping Specifically, that pump can be caused to operate continuously at the option of the aircraft pilot because the ON output of demand pump select switch S174 is connected directly to pump 80 through OR gate 216.

The demand pump 80 of hydraulic power supply 70 is also started up (automatically) prior to take-off of airplane 20 if switch S174 is in the AUTO position and if the flap operating lever (not shown) of airplane 20 is displaced to initiate the lowering of inboard and outboard flaps 52 and 50. To this end, the IN TRANSIT output of flap control unit 186 and the AUTO output of demand pump control switch S174 are connected through an AND gate 218, a second OR gate 220, and the above-mentioned OR gate 216 to demand pump 80. On take-off, demand pump 80 runs continuously until the wings 26 and 28 of airplane 20 are cleaned up; i.e., until inboard and outboard flaps 52 and 50 have been retracted and the IN TRANSIT signal from flap control unit 186 disappears and AND gate 218 therefore becomes inactive.

The demand pump 80 of Number 4 engine hydraulic power supply 70 is also run continuously during landing and then deactivated after a ten second delay if demand pump control switch S174 is in the AUTO position and either: (1) the flaps 50 and 52 of airplane 20 are not down (i.e., in a greater than zero degree position), or (2) air/ground logic 176 indicates that airplane 20 is on the ground. To accommodate this mode of operation, flap position switch S178 output >0° and the AIR output of air/ground logic 176 are connected through AND gate 222 to a timer 224. When AND gate 222 loses either input, timer 224 begins to count down; and AND gate 228, which has an input 226 from timer 224, thereby becomes conductive and remains so for the ten seconds or other period for which the timer is set. With input 226 active, demand pump control switch S174 thrown to the AUTO position, and AND gate 228 conductive, the AND gate output is coupled through OR gates 220 and 216 to demand pump 80, causing the latter to run.

The scheme just described ensures that adequate hydraulic service is available to supply the hydraulic systems typically operated at the same time during landing such as ground spoilers, rudders, thrust reversers, and brakes. Typically, this high demand will last for not longer than about three seconds; and the timer 224 therefore shuts down demand pump 80 only after this interval plus a safety margin (equalling ten seconds) has elapsed.

As suggested above, demand pump 80 is operated only once during take-off and once during landing rather than being cycled on and off as is typically the case in the operation of currently flying airplanes equipped with comparable pumps. This reduces the wear on those pumps (and other hydraulic power supply components). The resulting increase in service life is important because suitable pumps are expensive and because the replacement of those pumps is a time consuming task.

Next, the demand pump 80 of engine Number 4 associated hydraulic power supply 70 will also be started up automatically if: the pressure on the hydraulic fluid supplied by the Number 4 engine driven pump 72 falls below a designated level, typically 1400 psi, and demand pump control switch S174 is in the AUTO position. This keeps the pressure on the hydraulic fluid available to the operating systems of airplane 20 at a safe level and is accomplished by connecting the <1400 PSI output from engine driven pump pressure switch S184 and the AUTO output from demand pump control switch S174 to the inputs of an AND gate 230. The output of gate 230 is connected to a timer 232 which is typically set for a 14 second run time and which has an output connected to demand pump 80.

Typically, an increased demand on one or more of the four hydraulic power supplies 64 ... 70 of airplane 20 resulting in the hydraulic pressure falling below 1400 psi results from an emergency maneuver such as a diving hard turn. Generally, such demands can be satisfied by operating the demand pump 80 of the involved system for a brief period or, if necessary, for more than one such duty period. Timer 232 satisfies the objective of providing adequate hydraulic power in the unlikely event of such an occurrence.

As indicated in FIG. 7, a delay, typically 0.3 seconds, is also programmed into timer 232. The 0.3 second delay accommodates transients and anomalies in the pressure on the hydraulic fluid supplied by Number 4 engine associated hydraulic power supply 70. Absent that feature, the demand pump 80 might be started up in circumstances in which there was no actual demand for increased hydraulic service. That would also cause unnecessary wear of the hydraulic power supply components.

Finally, demand pump 80 of hydraulic power supply 70 is automatically started up to ensure continued safe operation of airplane 20 during flight if demand pump control switch S174 is in the AUTO position and fuel cut-off actuator 196 is moved to its OFF position to shut down engine Number 4, thereby also shutting down the engine driven pump 72 of hydraulic power supply 70. To this end, the AUTO output of demand pump control switch S174 and the CUT-OFF output of fuel cut-off actuator 196 are connected to an AND gate 234: and the output of the latter is connected through OR gates 220 and 216 to demand pump 80.

Referring still to FIG. 7, if demand pump control switch S174 is moved to one of its positions other than the ON and AUTO positions discussed above—i.e., to OFF or AUX—an OR gate 236 will become conductive. This has two results. One is that the demand pump low pressure light or annunciator 202 for hydraulic power supply 70 in aircraft flight deck hydraulic panel 156 will be illuminated. In addition, a signal will be transmitted to EIU interface 160; and this signal, combined with other information, will be processed to provide the hydraulic pressure reading continuously displayed by EICAS 164.

A signal indicating a low pressure output from demand pump 80 of hydraulic power supply 70 is also transmitted to EIU interface 160 after a two second delay if: (1) demand pump run switch S180 is in the RUN position, and the output pressure from demand pump 80 is less than 1400 psi as indicated by demand pump pressure switch S182, or (2) both the demand pump pressure switch S182 and the engine driven pump pressure switch S184 indicate that the outputs from the demand and engine driven pumps 80 and 72 both have a pressure of less than 1400 psi.

In the first of these circumstances, the flight deck crew is made aware from EICAS 164 that a demand pump 80 of an involved hydraulic power supply 64 ... 70 is running but that the output pressure is below the minimum required for safe operation of airplane 20. The EICAS-displayed information in the second of the related circumstances makes the crew aware that, whether or not a demand pump 80 is running, the hydraulic pressure on the fluid available from the involved hydraulic power supply 64 ... 70 is below the 1400 psi or other minimum level determined to be necessary for safe operation of airplane 20.

The hydraulic interface module functions just described are provided by connecting the RUN output of switch S180 and the <1400 PSI output of switch S182 of the inputs of an AND gate 238; by connecting the latter output and the <1400 PSI output of engine driven pump pressure switch S184 to an AND gate 240; by connecting the outputs of AND gates 238 and 240 to an OR gate 242; and by connecting the output of the latter through a timer 244 with a two second duration and OR gate 236 to EIU interface 160.

Demand pump 80 may require as long as two seconds to come up to the speed needed for it to produce a greater than 1400 PSI hydraulic fluid output. Timer 244, by providing a two second delay before transmitting "low pressure" information to EIU 160, therefore keeps EICAS 164 from indicating that a demand pump 80 is operating at low pressure while that pump is instead simply coming up to speed.

In addition to forwarding "low pressure" information to EIU 160, if either of the foregoing combinations of indications indicative of low demand pump pressure pump arise, the demand pump low pressure light or annunciator 202 for the Number 4 engine associated hydraulic power supply 70 will be illuminated. This occurs because the output of OR gate 236 is also connected to that flight deck-located annunciator.

Referring still to FIG. 7, the pressure switch S184 for the engine driven pump 72 of hydraulic power supply 70 is also connected through a separate delay timer 246 with a two second cycle to the EIU 160 and to the engine driven pump low pressure light or annunciator 204 for power supply 70 on the flight deck 24 of airplane 20. The low pressure annunciator 204 for system 70 is consequently illuminated and "low pressure" information transmitted to EIU 160 if the output pressure from engine driven pump 72 remains below the typical "safe" level of 1400 psi for more than two seconds. This period is adequate for the pump to come up to speed or for other anomalies in the output from pump 72 to be resolved.

Similarly, the <1200 PSI output from the pressure transmitter 190 of hydraulic power supply 70 is connected through a third delay timer 248 with a two second cycle to the system fault light or annunciator 200 in flight deck hydraulic panel 156 and to EIU 160. Thus, if the pressure on the hydraulic fluid available from the Number 4 engine associated hydraulic power supply 70 remains below 1200 psi for more than two seconds (a period also provided to resolve anomalies), the system fault light or annunciator 200 for that hydraulic power supply will be illuminated; and information indicating that a fault has developed in power supply 70 will be forwarded to EIU 160.

In conjunction with the foregoing, the reader is reminded that the information generated in EIU 160 and forwarded to EICAS 164 is also forwarded to central maintenance computer 162, as appropriate, so that any problems detected in the operation of airplane 20 can be corrected by maintenance personnel.

As is suggested above, the increased demand for hydraulic service can normally be satisfied by turning the involved demand pump 80 on for 10 second intervals when the flaps 52 and 50 of airplane 20 are down or for 14 seconds in case the delivery pressure of the associated engine driven pump 72 goes below 1400 psi. In contrast, if the involved demand pump 80 is started up by fuel cut-off actuator 196 having been moved to its CUT-OFF position, the involved demand pump 80 is caused to run continuously because the assoicated engine driven pump 72 shuts down; and demand pump 80 is therefore required to operate continuously in order to provide the hydraulic service required for the continued, safe operation of airplane 20.

As discussed above, the hydraulic interface module 154 for Number 4 engine associated hydraulic power supply 70 is also employed in starting up and shutting down the electrically driven auxiliary pump 82 of that system. This is accomplished by way of an AND gate 250. One input to AND gate 250 is from the ON output of ground power source (or handling) bus 188. A second input to AND gate 250 is from AND gate 240. That gate becomes conductive when the output pressure from the demand pump 80 and the output pressure from the engine driven pump 72 of hydraulic power supply 70 are both below 1400 psi. The third requirement for AND gate 250 to become conductive is for demand pump control switch S174 to be in the AUX position. With the foregoing conditions satisfied, AND gate 250 becomes conductive; and auxiliary pump 82 runs.

Figure 8:
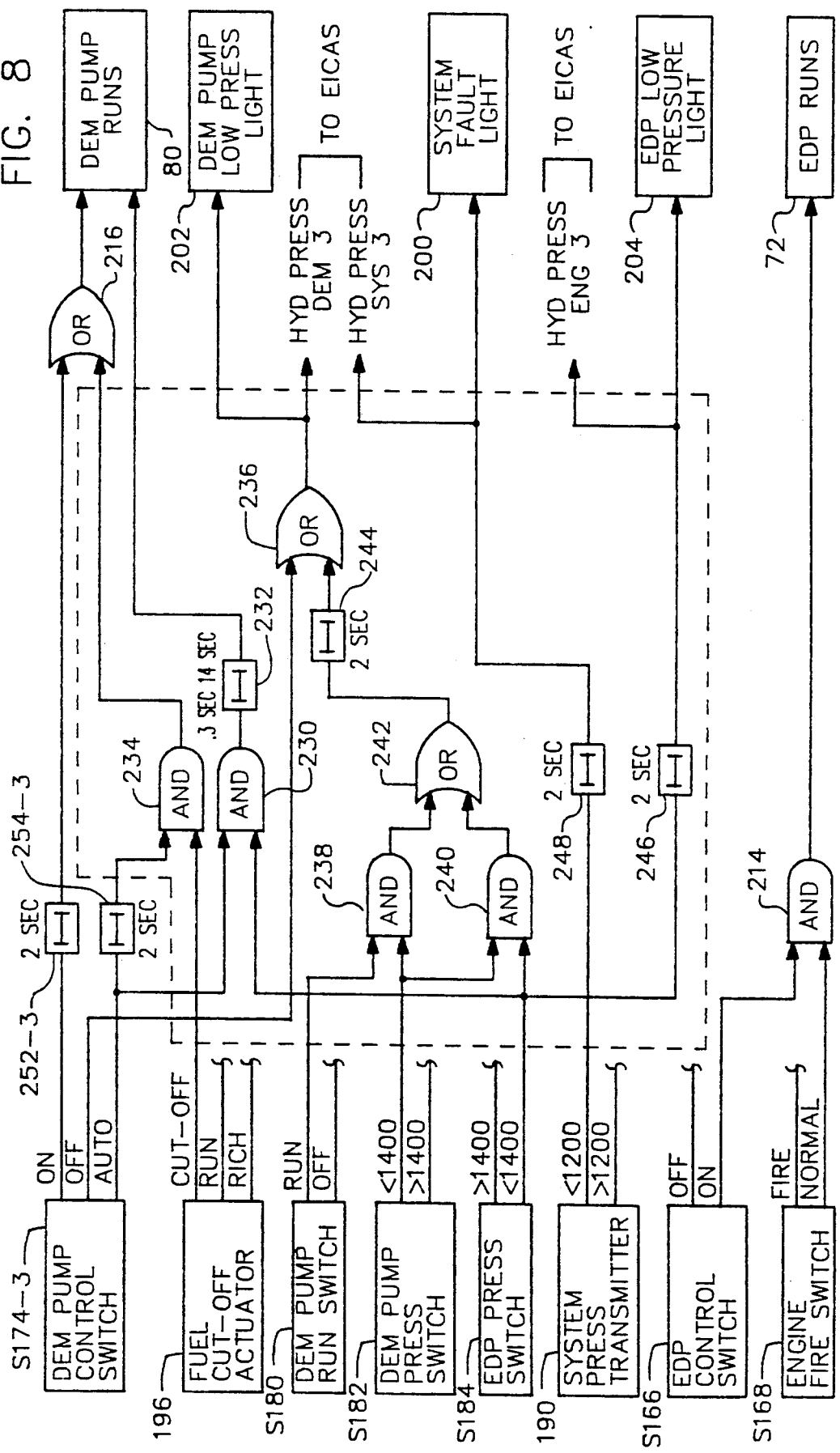

Referring now primarily to FIG. 8, the hydraulic interface module logic 154-3 for the Number 3 engine associated hydraulic power supply 68 differs from the just-described hydraulic interface module 154-4 logic primarily in that: it has no trailing edge flap position or motion inputs because flaps 50 and 52 are not serviced by hydraulic power supply 68; no inputs respecting brake system pressure are activated because brakes are similarly not serviced by power supply 68; and only a three-position demand pump control switch S174-3 is employed because hydraulic power supply 68 does not have an auxiliary pump. Switch S174-3 consequently does not require an AUX position.

Figure 9:
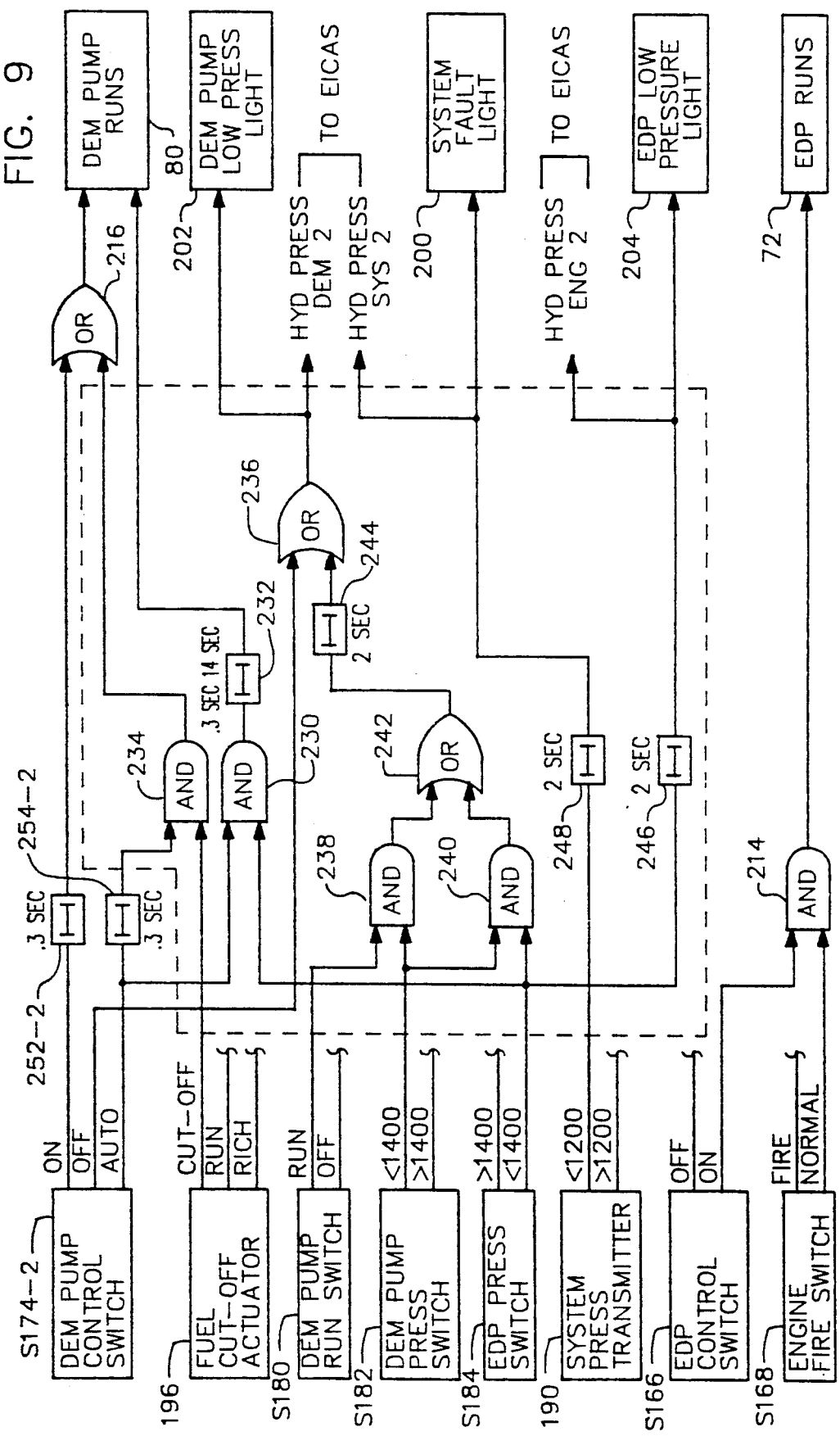

The hydraulic interface module 154-2 (FIG. 9) for the Number 2 engine associated hydraulic power supply 66 is essentially a duplicate of hydraulic interface module 154-3. An exception is that there is a two second delay between the time an appropriate signal is generated and demand pump 80 is actually started up in the case of hydraulic interface module 154-3 and only a 0.3 second delay in the same circumstances in the Number 2 engine associated hydraulic power supply 66. In the basic configuration of airplane 20, in which the demand pumps 80 of hydraulic power supplies 66 and 68 are electrically driven, this keeps the two demand pumps 80 from coming on simultaneously and perhaps thereby overloading the electrical system of airplane 20. Tis could occur in the absence of a staggered delay in the event of a momentary loss of power due to a lightning strike, the pilot switching from one electrical bus to another, etc.

The just described delays are provided by timers 252-3 and 254-3 (and 252-2 and 254-3). Timers 252 are located between the demand pump control switch ON outputs and OR gates 216. Timers 254 are located between the AUTO outputs of the demand pump control switches S174-2 and S174-3 and the AND gates 234 of hydraulic interface modules 154-2 and 154-3.

Also, in the hydraulic interface modules 154-2 and 154-3 of hydraulic power supplies 66 and 68, OR gates 220 are programmed out. The outputs from demand pump control switch timers 252 and the outputs from AND gates 234 are inputted to OR gates 216. Thus, as indicated above, the demand pumps 80 of hydraulic power supplies 66 and/or 68 will be turned on: (a) after a staggered time delay with the associated demand pump control switch or switches S174-2 and S174-3 in the ON position, or (b) after a similar delay with the foregoing switch(es) in the AUTO position and fuel cut-off actuator 196 moved to the CUT-OFF position.

The illustrated hydraulic interface module 154-1 for the hydraulic power supply 64 associated with Number 1 engine 30 is, essentially, a duplicate of the hydraulic interface module 154-4 for the Number 4 engine associated hydraulic power supply 70 except that the logic employed in hydraulic interface module 154-1 does not provide control for an electrically driven auxiliary pump 82 or an AUX position on demand pump control switch S174-1 unless the option to include an auxiliary pump in hydraulic power supply system 64 is exercised.

It will be apparent to the reader from the foregoing that the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. A hydraulic power supply for making pressurized hydraulic fluid available to one or more hydraulically operated devices, said power supply comprising: a demand pump which provides pressurized hydraulic fluid for the operation of said device(s) and can be activated at the option of an operator and/or activated automatically upon a predicted increase in demand to prevent precipitous drops in the hydraulic fluid delivery pressure; a controller which: controls the operation of said pump means and makes available information relating to the operational status of the power supply; and an annunciator inputted from said controller for providing a low pressure warning if the pressure on the hydraulic fluid drops below a selected level, there being means in said controller which keeps said annunciator from being activated for a period of specified duration after said demand pump is turned on so that said annunciator will not provide a low pressure signal while said demand pump is simply coming up to speed.

2. A hydraulic power supply for making pressurized hydraulic fluid available to one or more hydraulically operated devices, said power supply comprising: a pump means which provides pressurized hydraulic fluid for the operation of said device(s); a controller which: controls the operation of said pump means and makes available information relating to the operational status of the power supply; an annunciator inputted from said controller for providing a low pressure warning if the pressure on the hydraulic fluid drops below a selected level; and means which is activated and provides an input to said controller if the pressure on the hydraulic fluid is at, or drops below, the selected level, there being means in said controller which keeps said annunciator from being activated for a period of selected duration after said controller pump input providing means is activated to thereby keep said annunciator from providing a low pressure warning while said pump means is coming up to speed or if there is a short term anomaly in the output from said pump means.

3. An aircraft which includes an engine and a hydraulic power supply as defined in claim 2, the pump means of said power supply being driven by said engine.

4. An aircraft which has multiple engines, one or more hydraulically operated devices, and a plurality of mutually isolated, redundant, aircraft engine-associated hydraulic power supplies for making pressurized hydraulic fluid available to said hydraulically operated device(s), each said power supply comprising: an aircraft engine driven pump means which provides pressurized hydraulic fluid for the operation of said device(s) and a centralized solid state controller which: controls the operation of said pump means and makes available information relating to the operational status of the power supply, the engine driven pump of each power supply being driven by a different one of the aircraft engines, each said power supply also including a demand pump, the demand pumps in at least two of the hydraulic power supplies being electrically driven, and said aircraft also having an electrical power supply and means for preventing said power supply from being overloaded by keeping the electrically driven demand pumps of two or more power supplies from coming on at the same time.

5. A hydraulic power supply for making pressurized hydraulic fluid available to one or more hydraulically operated devices, said power supply comprising: a pump means which provides pressurized hydraulic fluid for the operation of said device(s) and comprises a first, engine driven pump and a second, demand pump with a centralized solid state controller which controls the operation of said pump means and makes available information relating to the operational status of the power supply, said solid state controller including: means activatable at the option of an operator to activate said demand pump, means for predicting an increase in the demand upon the engine driven pump, and means for automatically activating said demand pump upon a predicted increase in demand to prevent precipitous drops in the hydraulic fluid delivery pressure.

6. An aircraft which has a hydraulic power supply as defined in claim 5 and means activated from a solid state controller output for warning the flight deck crew that: (a) the pressure on the hydraulic fluid made available by the engine driven pump has fallen below a specified minimum, (b) the pressure on the hydraulic fluid made available by the demand pump has fallen below a specified minimum, and/or (c) there is a fault in the hydraulic power supply.

7. A hydraulic power supply as defined in claim 5 which includes switch means which can be thrown at the option of an operator to cause said demand pump to operate continuously and irrespective of the demand for hydraulic power.

8. A hydraulic power supply as defined in claim 5 which comprises operator exercisable means for enabling and disenabling said engine driven pump.

9. An aircraft which includes a hydraulic power supply as defined in claim 5 and wherein the solid state controller of said power supply includes means for effecting operation of both said engine driven pump and said demand pump: (a) while the aircraft is airborne and the flaps of the aircraft are down, and/or (b) upon the receipt of a signal indicative of the imminent movement of said flaps.

10. An aircraft which includes a hydraulic power supply as defined n claim 5 and wherein the solid state controller of said power supply comprises means for automatically effecting start-up of said demand pump in the event of an occurrence which results in the shutdown of the first, engine driven pump while the aircraft is operating.

11. A hydraulic power supply for making pressurized hydraulic fluid available to one or more hydraulically operated devices, said power supply comprising: a pump means which provides pressurized hydraulic fluid for the operation of said device(s) and a centralized solid state controller which: controls the operation of said pump means and makes available information relating to the operational status of the power supply, said pump means comprising a first, engine driven pump and a second, demand pump which can be activated at the option of an operator and/or activated automatically upon a predicted increase in demand to prevent precipitous drops in the hydraulic fluid delivery pressure and said solid state controller having means which is effective to shut down said demand pump after that pump has run for a period of selected duration.

12. A hydraulic power supply for making pressurized hydraulic fluid available to one or more hydraulically operated aircraft devices, said power supply comprising: a pump means which provides pressurized hydraulic fluid for the operation of said device(s) and a centralized solid state controller which: controls the operation of said pump means and makes available information relating to the operational status of the power supply, said pump means comprising a first, engine driven pump and a second, demand pump which can be activated at the option of an operator and/or activated automatically upon a predicted increase in demand to prevent precipitous drops in the hydraulic fluid delivery pressure and said solid state controller having means which is effective to cause said demand pump to shut down following the touchdown of the aircraft and the subsequent lapse of a specified time period.

13. A hydraulic power supply for making pressurized hydraulic fluid available to one or more hydraulically operated devices, said power supply comprising: a pump means which provides pressurized hydraulic fluid for the operation of said device(s) and a centralized solid state controller which: controls the operation of said pump means and makes available information relating to the operational status of the power supply, said pump means comprising a first, engine driven pump and a second, demand pump which can be activated at the option of an operator and/or activated automatically upon a predicted increase in demand to prevent precipitous drops in the hydraulic fluid delivery pressure and said solid state controller having means for automatically shutting off said demand pump after the pump has run for a period of preselected duration.

14. A hydraulic power supply for making pressurized hydraulic fluid available to one or more hydraulically operated devices, said power supply comprising: a pump means which provides pressurized hydraulic fluid for the operation of said device(s) and a centralized solid state controller which: controls the operation of said pump means and makes available information relating to the operational status of the power supply, said pump means comprising a first, engine driven pump and a second, demand pump which can be activated at the option of an operator and/or activated automatically upon a predicted increase in demand to prevent precipitous drops in the hydraulic fluid delivery pressure and said solid state controller having means for delaying the start-up of said demand pump for a predetermined period after the receipt of an input indicative of an increased demand on the hydraulic power supply, thereby preventing transient anomalies in the pressure on the hydraulic fluid from effecting an unwanted start-up of said demand pump.

15. A hydraulic power supply for making pressurized hydraulic fluid available to one or more hydraulically operated devices, said power supply comprising: a pump means which provides pressurized hydraulic fluid for the operation of said device(s) and includes a first, engine driven pump and a second, demand pump which can be activated at the option of an operator and/or activated automatically upon a predicted increase in demand to prevent precipitous drops in the hydraulic fluid delivery pressure; a centralized solid state controller which: controls the operation of said pump means and makes available information relating to the operational status of the power supply; an engine for driving the first pump of said power supply; and a fuel cut-off actuator for terminating the supply of fuel to said engine, the solid state controller of said power supply comprising means for effecting the start-up of said demand pump upon receipt of an input indicating that said fuel cut-off has been so actuated as to cut off the supply of fuel to said engine.

16. A hydraulic power supply for making pressurized hydraulic fluid available to one or more hydraulically operated devices, said power supply comprising: a pump means which provides pressurized hydraulic fluid for the operation of said device(s) and a centralized solid state controller which: controls the operation of said pump means and makes available information relating to the operational status of the power supply, the pump means of said power supply comprising a first, aircraft driven pump and a second, auxiliary pump which is operable independently of the aircraft engine and said solid state controller including means for disenabling said auxiliary pump when said aircraft engine is running.

17. The combination of a hydraulic power supply as defined in any of claims 5, 11, 12, 13, 14, 15, or 16 and means for processing and making available in recoverable form information inputted from the solid state controller of the power supply and relating to problems in the hydraulic power supply that require the attention of maintenance personnel.

18. A combination as defined in claim 17 wherein said solid state controllers comprise means for inputting to said information processing means information relating to: the quantity of the hydraulic fluid in the the power supply, the temperature of the hydraulic fluid, the pressure on the fluid, and/or information relating to failures in the solid state controller and other components of said hydraulic power supply.

19. An aircraft as defined in claim 16 wherein the solid state controller has means for effecting the start-up of said pump means only if an external power supply for said second pump is operatively connected thereto.

20. An aircraft which has at least two power supplies for making hydraulic fluid available to one or more hydraulically operated devices, each said power supply comprising: a pump means which provides pressurized hydraulic fluid for the operation of said device(s) and a centralized solid state controller which: controls the operation of said pump means and makes available information relating to the operational status of the power supply, the pump means of each of said hydraulic power supplies including a first, aircraft engine driven pump and a second, electrically driven pump which can be operated independently of the first, engine driven pump and the solid state controller of each power supply including means for preventing the electrically driven pumps of the hydraulic power supplies from being started up simultaneously, thereby keeping the electrical system of the aircraft from being overloaded by the start-up of the electrically driven pumps.

21. An aircraft which has an engine, one or more hydraulically operated devices, and a hydraulic power supply for making pressurized hydraulic fluid available to said hydraulically operated device(s), said power supply comprising: a pump means which provides pressurized hydraulic fluid for the operation of said device(s) and comprises a first, engine driven pump and a second, demand pump and said aircraft further comprising means for shutting down said engine driven pump and automatically starting up the demand pump upon receipt of a low pressure signal indicating that the pressure on the hydraulic fluid has fallen below a selected level and means for minimizing unneeded start-ups of said demand pump by delaying the starting up of said pump for a period of selected duration following the receipt of the low pressure signal.

22. An aircraft which has multiple engines, one or more hydraulically operated devices, and a plurality of mutually isolated, redundant, aircraft engine-associated hydraulic power supplies for making pressurized hydraulic fluid available to said hydraulically operated device(s), each said power supply comprising: an aircraft engine driven pump means which provides pressurized hydraulic fluid for the operation of said device(s) and a centralized solid state controller which: controls the operation of said pump means and makes available information relating to the operational status of the power supply, the engine driven pump of each power supply being driven by a different one of the aircraft engines, the solid state controllers of the power supplies all having the same logic, and said controllers having selectively available inputs and outputs which can be employed to make each of said solid state controllers capable of performing a selected part, or all, of the functions of which it is capable.

23. An aircraft which has multiple engines, one or more hydraulically operated devices, and a plurality of mutually isolated, redundant, aircraft engine-associated hydraulic power supplies for making pressurized hydraulic fluid available to said hydraulically operated device(s), each said power supply comprising: an aircraft engine driven pump means which provides pressurized hydraulic fluid for the operation of said device(s) and a centralized solid state controller which: controls the operation of said pump means and makes available information relating to the operational status of the power supply, the engine driven pump of each power supply being driven by a different one of the aircraft engines, the pump means of each power supply including a first, engine driven pump and a second, demand pump and said aircraft having a pneumatic system and means for supplying air from said pneumatic system to the demand pump of at least one of said hydraulic power supplies to operate the demand pump of that power supply.

24. An aircraft as defined in any of claims 20, 21, 22, or 23 wherein the solid state controller of the, or each involved, power supply includes means for activating a signal in the cockpit or on the flight deck of the aircraft if the hydraulic pressure in all braking systems with which the aircraft is equipped falls below a specified level.

25. An aircraft as defined in any of the preceding claims 20, 21, 22, or 23 which has means for processing and making available in recoverable form information inputted from the solid state controller of a hydraulic power supply and relating to problems in a hydraulic power supply that require the attention of maintenance personnel.

26. An aircraft as defined in claim 25 wherein the solid state controller of at least one hydraulic power supply comprises means for inputting to said information processing means information relating to: the quantity of the hydraulic fluid in the power supply in which the solid state controller is incorporated, the temperature of the hydraulic fluid, the pressure on said fluid, and/or information relating to failures in the solid state controller and other components of the power supply in which it is incorporated.

27. An aircraft as defined in claim 22 wherein each of said solid state controllers is contained on a single card.

28. An aircraft as defined in claim 23 which has means for electrically operating the demand pump of at least one other of said hydraulic power supplies.

29. An aircraft which has multiple engines, one or more hydraulically operated devices, and a plurality of mutually isolated, redundant, aircraft engine-associated hydraulic power supplies, each capable of making pressurized hydraulic fluid available to all of the hydraulically operated devices which may be present, each said power supply comprising: an aircraft engine driven pump means which provides pressurized hydraulic fluid for the operation of said device(s) and a centralized solid state controller which controls the operation of said pump means, the engine driven pump means of each power supply being driven by a separate, distinct, and single one of the aircraft engines.

30. An aircraft as defined in claim 29 which has means for supplying fluid from at least two of said hydraulic power supplies to the, or each, hydraulic device so that said aircraft can continue to operate normally even if one of those hydraulic power supplies goes down.

31. An aircraft as defined in claim 29 wherein each of said hydraulic power supplies has a centralized, independently programmable, solid state controller.

32. An aircraft as defined in claim 29 wherein said hydraulically operated devices comprise hydraulically operated flaps, at least one of said hydraulic power supplies also having a demand pump, and the solid state controller of said one of said power supplies comprising means for automatically causing both said engine driven pump means and the demand pump of said power supply to operate when said flaps are down during takeoff and landing.

33. An aircraft as defined in claim 29 wherein the solid state controller of the, or each involved, power supply includes means for activating a signal in the cockpit or on the flight deck of the aircraft if the hydraulic pressure in all braking systems with which the aircraft is equipped falls below a specified level.

34. An aircraft as defined in claim 29 in which one of said hydraulic power supplies has an auxiliary pump which can be operated with the aircraft engines shut down to supply hydraulic fluid to said hydraulic device(s).

* * * * *